Dec. 19, 1961 W. E. MEISSNER 3,013,311
TUBING MANUFACTURE

Filed Dec. 15, 1958 2 Sheets-Sheet 1

Dec. 19, 1961   W. E. MEISSNER   3,013,311
TUBING MANUFACTURE

Filed Dec. 15, 1958   2 Sheets-Sheet 2

United States Patent Office 3,013,311
Patented Dec. 19, 1961

3,013,311
TUBING MANUFACTURE
William E. Meissner, Devon, Pa., assignor to American Viscose Corporation, Philadelphia, Pa., a corporation of Delaware
Filed Dec. 15, 1958, Ser. No. 780,291
20 Claims. (Cl. 18—57)

The invention relates to the manufacture of tubes and film, and particularly to an improved method for shaping a plasticized material into the form of a seamless tube or film.

In conventional procedures for making seamless tubes, a plasticized material is, in general, blown into shape, drawn over a molding means, or extruded through an opening of desired configuration. The application of an expanding force to a mass of plasticized material, as practiced for example in the glass-blowing art, is neither economical nor adapted for making continuous tubes. Drawing of a plasticized material over a mandrel provides for a simple and relatively inexpensive tube-making process. This technique, however, permits little, if any, control over the tube wall thickness and, in its simplest form, involves a sacrifice in the finish of the tube exterior for the sake of economical operation. The extrusion process is perhaps the most common mode of forming tubes since it offers almost complete control over the size and shape of the tubes being formed. The initial expense of the precise extrusion dies essential for this process, combined with the continuous die maintenance, render this method quite costly. Since obstructions between the lips of an extrusion die would result in defects in the tube wall, the extrusion process further requires critical control and rather complex processing of the material which is to be extruded. In view of the above-noted disadvantages, a primary object of the present invention is to provide a new or generally improved and more satisfactory method for making tubes and like articles.

Another object of the invention is the provision of a method wherein a plasticized material is shaped into the form of a seamless tube by combined extrusion and drawing operations.

Still another object of the invention is to provide a method for continuous tube manufacture wherein a plasticized material is hydraulically shaped into a seamless tube of desired and uniform wall thickness.

A further object of the invention is the provision of a method wherein a plasticized material is drawn through a liquid bath and relative to a contained fluid charge to effect shaping of the same into a seamless tube which is then slit longitudinally for forming a flat film.

These and other objects and advantages of the invention will be apparent from the following description and accompanying drawing in which.

Figure 1:
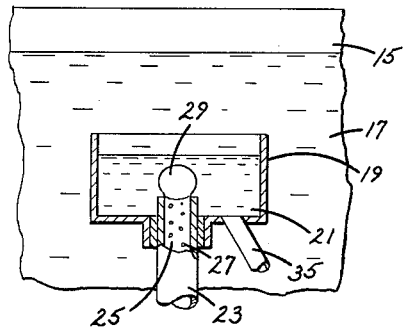
FIGURE 1 is a diagrammatic view illustrating an initial step in the tube-forming process of the present invention of injecting a fluid charge into a mass of plasticized material.

The manufacture of tubes or like articles in accordance with the present invention is, in general, achieved by containing a fluid charge within a mass of plasticized material positioned within a liquid bath, and thereafter drawing the plasticized material through the liquid bath and relative to the contained fluid charge to thereby shape the same into a desired tube form. Setting or stabilizing of the plasticized material of the formed tube may be effected either during or after the tube passage through the liquid bath, or during both stages, depending upon the particular plasticized material employed.

Containment of the fluid charge is accomplished by injecting the same into the mass of flowable material, thus expanding a portion of the mass into a bulbulous envelope. The withdrawal of this envelope from the liquid bath initiates the shaping of the plasticized material into a tube form and facilitates easy lacing operations. As mentioned above, and more fully described hereafter, the fluid charge serves as an internal mandrel during the tube drawing operation and therefore consists either entirely of liquid or a mixture of liquid and gas. A charge having some gas is preferred however since it buoys the initially expanded portion of the plasticized material toward the surface of the liquid bath, and also facilitates a desired expansion of the tube as it is drawn, without any great increase in the weight of the charge itself.

While the liquid bath surrounding the mass of plasticized material may serve to set or coagulate the tube as it is formed, its primary function is to cooperate with the contained fluid charge in controlling the thickness of the tube wall and in smoothing irregularities from the plasticized material as it is drawn from the mass. As will be more apparent hereafter, the liquid bath and fluid charge confine the plasticized material along a streamlined path as it is drawn and thus can be best visualized as together functioning as a liquid extrusion die hydraulically shaping the plasticized material into a tube form.

The apparatus for drawing the plasticized material relative to the contained fluid charge can be of a conventional form which is best suited for the particular tube being made. When employing a fluid charge composed of liquid and gas, nip rolls or other similar means which will flatten or pinch the tube after it is formed, are preferred to prevent gas escape.

Various factors, such as the rate of drawing, the density and temperature of the liquid bath and confined fluid charge, and the character of the plasticized material have a bearing on the size of the tube which is formed. These factors thus offer a means whereby complete control may be exercised over the diameter and wall thickness of the tube during formation.

Throughout the description, the term "liquid" is intended to include both solutions as well as materials which are in a molten state at the temperature at which the present method is practiced. The terminology "plasticized material" as referred to above and throughout the remainder of the description and claims, denotes materials which are of greater density than the surrounding liquid bath and in a flowable, viscous, or plastic condition at and during drawing of the same into a tube form. Included within this definition are a variety of organic film-forming materials of either thermoplastic or thermosetting character, as well as solutions, as for example of viscose, nitrocellulose, cellulose ethers and esters. Examples of thermoplastic materials suitable for use with the present invention include vinyl resins, such as polyvinyl acetate, copolymers of vinyl chloride and vinyl acetate, copolymers of acrylonitrile and vinyl acetate, polyacrylonitrile and copolymers of acrylonitrile with vinyl chloride, vinyl acetate, methacrylonitrile, and so forth, also polyolefines such for example as polyethylene, polypropylene, linear superpolymers of the polyester or nylon (polyamide) type, polyvinyl butyral, polyvinyl alcohols, polyvinyl ethers, while suitable thermosetting materials may include phenol aldehyde resins, urea aldehyde resins, melamine aldehyde resins and sulfonamide aldehyde resins. The inner and outer liquids may be different and reactive with each other so that they form a film at their interface, such for example as an amide and an acid of the type which will polymerize to form a polyamide film at the interface. It is to be understood that the mentioning of these particular materials is not intended to limit the invention thereto but merely to illustrate the wide variety of materials that can be used in carrying out the invention.

With reference to the drawing, and particularly FIGURES 1-5, the apparatus employed in the method of the present invention is relatively simple and includes a tank 15 for holding a liquid bath 17, a trough 19 positioned below the surface of the bath 17 for containing a mass of plasticized material 21, and a supply pipe 23 extending up through the bottom wall of the trough 19 for injecting a fluid charge into the mass of plasticized material. The fluid charge, more fully described hereafter, is of predetermined weight and volume, and preferably includes a liquid and gas, denoted by the characters 25 and 27, respectively, which may be delivered as a mixture. The character of the liquid bath 17 and/or liquid portion 25 of the fluid charge will, of course, vary with the particular plasticized material employed and the desired size of the tube to be formed. However, for the sake of ease and simplicity of description, both of these liquids 17 and 25 will be considered to be of the same density unless otherwise noted.

Figure 2:
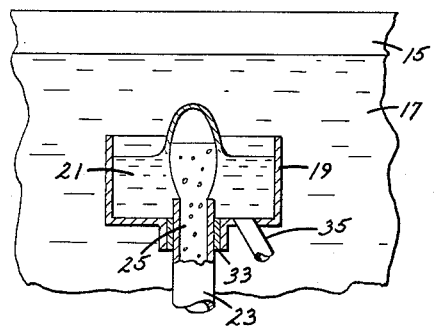
FIGURE 2 is a view similar to FIGURE 1 showing a preliminary expansion of a portion of the plasticized material during the injection of the fluid charge therein.
Figure 3:
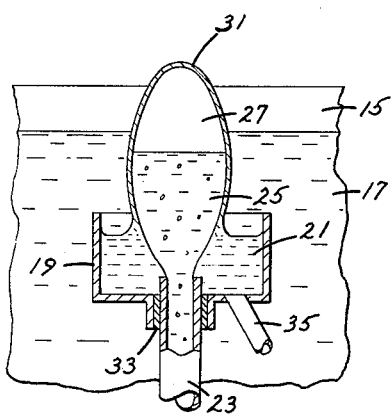
FIGURE 3 illustrates the expanded plasticized material of FIGURE 2 projecting above the level of the surrounding liquid bath after being further enlarged by the fluid charge.
Figure 4:
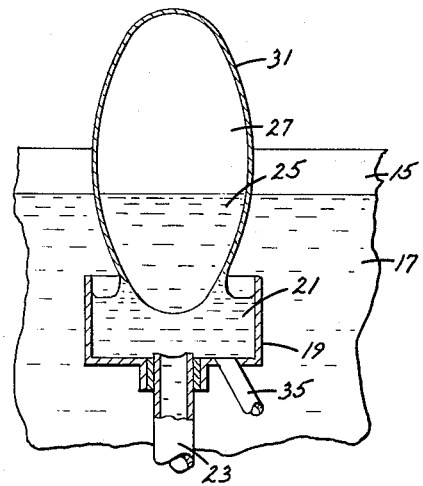
FIGURE 4 shows the expanded plasticized material of FIGURE 3 after complete injection of the fluid charge therein.

During the initial injection of the fluid charge, the gaseous portion 27 travels up through the liquid 25 in the pipe 23 and forms a bubble in the mass of plasticized material 21, as shown at 29 in FIGURE 1. With continued delivery of the fluid charge, the increasing volume of liquid and gas contained within the plasticized material 21 gradually expands the initially formed bubble 29 and, in effect, causes an upward flow of the plasticized material 21, as shown in FIGURES 2 and 3, to form a bulbulous thin-walled envelope 31. During this gradual expansion of the plasticized material 21, the envelope is buoyantly elevated toward the surface of the bath 17 by the gaseous portion 27 of the fluid charge until, as shown in FIGURE 4, the injection of the fluid charge is completed. It will be noted that at this stage the envelope 31 projects well above the surface of the bath 17 and that the gaseous portion 27 of the fluid charge maintains the envelope in an expanded form. The liquid of the bath 17 and the liquid portion 25 are of the same density and thus, in the equilibrium condition of FIGURE 4, assume substantially the same level, with the fluid charge being completely contained within plasticized material 21.

Figure 5:
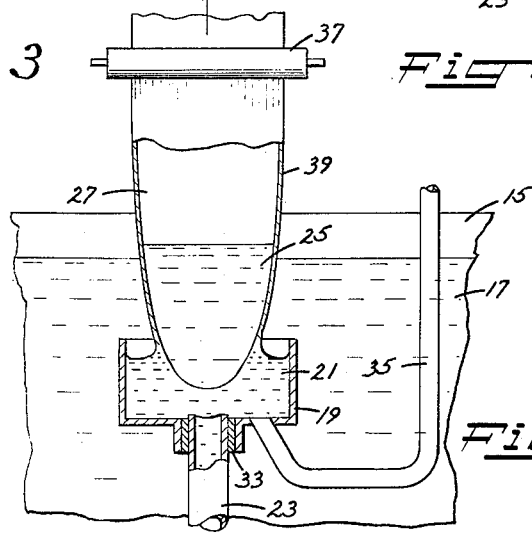
FIGURE 5 is a diagrammatic view illustrating one form of apparatus for practicing the method of the present invention.

The supply pipe 23, in the embodiment of FIGURES 1-5, serves only as a means for injecting the fluid charge into the initial mass of plasticized material and thus may be moved into a retracted position, as shown in FIGURES 4 and 5, either during or after the formation of the envelope 31. Any suitable means, as for example a rack and pinion not shown, may be employed in retracting the pipe 23, with a sealing ring 33 being provided between pipe 23 and trough wall to prevent leakage of plasticized material thereat.

Concomitantly with the shaping of the plasticized material 21 into the envelope 31, and throughout the continuous tube manufacture, additional plasticized material 21 is supplied into the trough 19 through the feed line 35 to maintain the level thereof substantially constant. As shown in FIGURE 5, a substantial length of the feed line 35 is immersed within the bath 17, thus allowing the plasticized material 21 to assume the same temperature as the bath liquid during its delivery into the trough 19.

The initially formed envelope 31 is withdrawn from the bath 17 and laced between a pair of nip rolls 37 which are preferably driven at a constant rate. In this manner, a uniform amount of plasticized material 21 is drawn from the trough 19 up through the bath 17 and relative to the confined or contained fluid charge, and is thereby shaped into a tube form as shown at 39. Coagulation or stabilization of the tube wall may be partially or completely effected by the liquid bath as the tube is drawn therethrough. Alternatively, or in combination with this procedure, the tube 39 may be set as it leaves the bath 17 by the atmosphere above the bath 17, or by heated or chilled liquids or gases impinged against the surface thereof. It will be noted that the use of nip rolls 37 as described above causes a pinching or flattening of the tube 39 and thus the gaseous portion 25 of the fluid charge is retained in a confined position. While this procedure is highly desirable when making a flexible tube or casing, it will be understood that conventional pipe draw rolls may be substituted for the nip rolls 37 when a rigid tube is being formed.

Disregarding any shrinkage which may occur during the tube-setting or stabilization stage, the internal diameter of the finished tube will, in general, be equal to the diameter of the surface area of the liquid portion 25 of the confined fluid charge. It will be noted, however, that while the liquid portion 25 assumes the same level as the bath 17 in an equilibrium condition as shown in FIGURE 4, the upward or longitudinal pull applied to the tube 39 causes the tube to neck radially inward. This counterbalancing of the longitudinally pull on the tube wall thus elevates the level of the liquid portion 25 slightly above that of the bath 17 and reduces its surface area. Aside from employing liquids of different densities in the fluid charge and bath 17, as discussed hereafter, complete control over the internal size of the tube being formed may be exercised by varying either the rate of tube withdrawal by the nip rolls 37 or the volume of the liquid portion 25 of the fluid charge or the distance between the level of the bath 17 and the plasticized material 21 in the trough, or a combination of these factors.

During the formation of both the envelope 31 and the continuous tube 39, an annular layer of plasticized material appears to flow along the surface of the confined mass as it is drawn from the trough and shaped into a tube. The liquid bath 17 and the liquid portion 25 of the confined fluid charge confine the plasticized material to a streamlined path, and in effect, cooperate together as a pair of fluid extrusion die lips which hydraulically shape the plasticized material into a tube form. Since the weights of the liquids within and surrounding the tube 39 remain substantially constant, the opposing forces acting on the plasticized material as it is drawn from the trough 19 are constant, and thus the tube 39 is formed with a wall of uniform thickness. It will be further noted that the liquid forces acting on the plasticized material during its streamlined travel insure that any irregularities in the plasticized material will be removed or at least minimized without actually affecting the tube-forming process or the tube structure.

Figure 6:
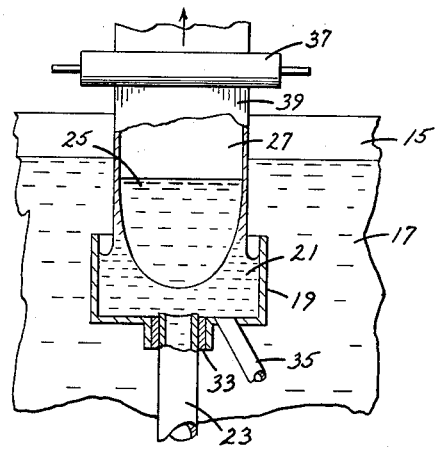
FIGURE 6 illustrates a fragmentary portion of the structure of FIGURE 5, showing the use of a contained fluid charge of greater density than the liquid of the surrounding bath.
Figure 7:
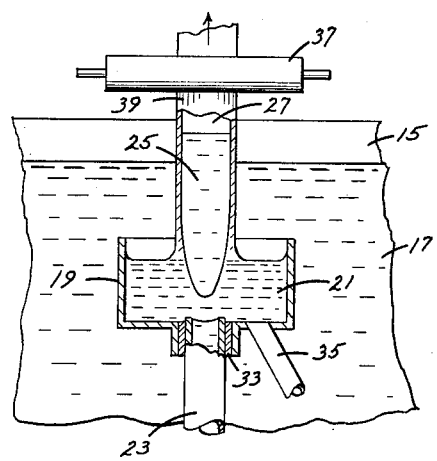
FIGURE 7 is a view similar to FIGURE 6 showing the use of a contained fluid charge of less density than the liquid of the surrounding bath.

As heretofore mentioned, the internal size of the tube can be varied by employing liquids of different densities for the liquid bath 17 and the liquid portion 25 of the fluid charge. With a difference in density existing between the cooperating liquids, the liquid portion 25 of the fluid charge will assume a level at which its weight per unit area is counterbalanced by an equal opposing pressure exerted by the surrounding liquid bath 17. Theoretically, the forces exerted by the portion of the tube 39 in contact with the liquid portion 25 and the buoyancy of the confined gaseous portion 27 of the fluid charge also enter into this equalization of opposing pressures. In an equilibrium condition, the liquid portion 25 of the confined fluid charge presents a relatively large surface area at its uppermost level when it is of greater density than the liquid of the bath 17, as shown in FIGURE 6, thus providing a tube 39 of larger internal diameter than is obtained with the liquids described above with reference to FIGURES 1–5. On the other hand, a confined fluid charge having a liquid portion 25 of less density than the liquid of bath 17 presents a relatively small surface area and thereby provides a tube of reduced internal size, as shown in FIGURE 7. Assuming that the liquid and gaseous portions of the fluid charges employed in illustrations of FIGURES 5, 6 and 7 are of the same volumes, it will be noted that the liquid portion 25 which is of greater density than the liquid of the bath 17 assumes a level which is lower than that of the bath 17 (FIGURE 6), while the level of a confined liquid portion 25 of less density is above that the bath 17 (FIGURE 7). In it will be noted, however, that the tubes of plasticized material in FIGURES 6 and 7 are subjected to the longitudinal pull of the nip rolls 37, and thus the levels of the liquid portions 25 are illustrated as being at slightly higher levels than that which would exist at an equilibrium state, for reasons as heretofore described.

In addition to imparting a buoyant character to the envelope 31 of plasticized material during the initiation of the tube-forming procedure, the gaseous portion 27 of the fluid charge, which is confined within the tube by the liquid portion 25 and the nip rolls 37, serves to prevent collapse of the tube prior to and/or during its stabilization stage. With plasticized materials which are in a tacky condition when withdrawn from the bath 17, it will be apparent that the confined gaseous portion 27 prevents portions of the internal wall surface from adhering to each other. For example, when employing viscose as the plasticized material 21 and water as the liquid bath 17 and confined fluid charge 25, the tube 39 which is initially formed is coagulated as it travels through the bath 17 and can then be maintained in an expanded shape by a confined gas 27, such as air, while it undergoes regeneration by heated fluids. The nature and volume of the confined gas will depend upon various factors such as the chemical character of the plasticized material, the wall thickness of the tube 39 and the particular setting medium used.

Figure 8:
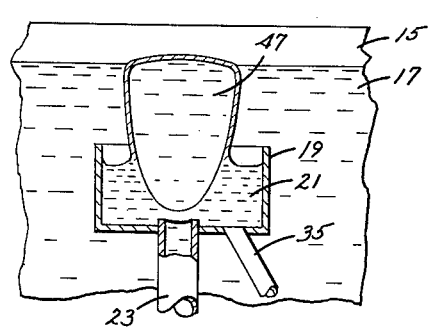
FIGURE 8 is a view similar to FIGURE 4 showing a portion of a mass of plasticized material expanded by a fluid charge consisting entirely of liquid.

When forming tubes which have a rigid structure in their completed state, the fluid charge initially confined within the mass of plasticized material 21 may consist entirely of liquid, as shown at 47 in FIGURE 8. This liquid charge 47 is injected into the mass of plasticized material 21 in the same manner as described with reference to FIGURES 1–5 and completely fills the expanded envelope 49 which is initially formed. The envelope 49 is then withdrawn from the bath 17 to draw plasticized material from the trough 19 and shape the same into a tube as heretofore described. Conventional pipe draw rolls, not shown, may be substituted for the nip rolls 37 when rigid tubes are being formed. It will be understood that a confined fluid charge consisting entirely of liquid can be employed in making tubes which are either of flexible or rigid character and, if desired, that a fluid charge of liquid and gas may be used in at least initiating the formation of rigid tubes.

Figure 9:
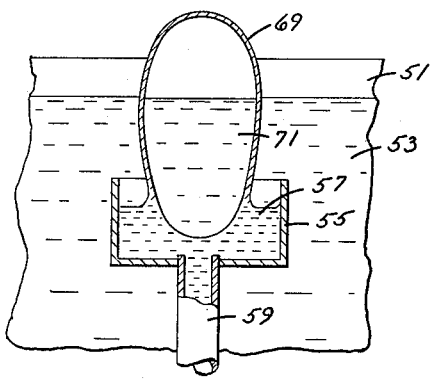
FIGURE 9 is a view similar to FIGURE 4 illustrating a portion of a modified apparatus for practicing the method of the present invention.
Figure 10:
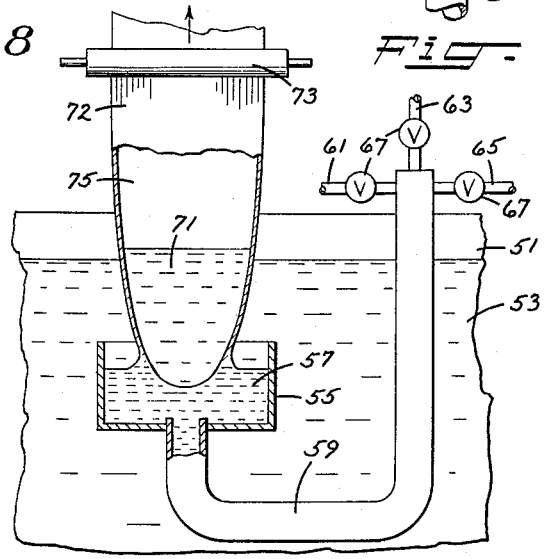
FIGURE 10 is a diagrammatic view showing the modified apparatus of FIGURE 9 in greater detail.

With reference to FIGURES 9 and 10 of the drawing, there is illustrated a modified apparatus for carrying out the method of the present invention. As with the apparatus of FIGURES 1–8, this embodiment includes a tank 51 for holding a liquid bath 53, a trough 55 which contains a mass of plasticized material 57, and a delivery conduit 59. One end of the conduit 59 extends up through the bottom wall of the trough 55 and projects into the plasticized material 57, while its opposite end is connected to suitable sources of liquid, gas, and plasticized material by conduits 61, 63 and 65, respectively, each having a control valve 67.

Initially, a mass of plasticized material 57, is delivered into the trough 55 after which a fluid charge is injected therein through the conduit 59. The fluid charge may consist entirely of liquid as shown in FIGURE 8, but is preferably a mixture of liquid and gas as described with reference to FIGURES 1–5. With the injection of the fluid charge, the mass of plastic material is gradually expanded in generally the same manner as is shown in FIGURES 1–3, and finally into a bulbulous thin wall envelope 69 as shown in FIGURE 9. Once the fluid charge injection is completed, it will be noted that the plasticized material 57 completely contains the same.

One essential difference in the structure of FIGURES 9 and 10 is that the conduit 59 serves as a means for injecting the fluid charge into the plasticized material initially delivered into the trough 55, and further, as a feed line for supplying plasticized material for continuous tube manufacture. The valves 67 in the conduits 61 and 63 are closed after predetermined amounts of liquid and gas are introduced into the conduit 59, and the valve 67 in conduit 65 is then opened to supply plasticized material 57. The plasticized material 57 delivered through the conduit 59 thereby forces the final portion of the fluid charge into the plasticized material contained in the trough 55. As the envelope 69 is withdrawn upwardly out of the bath 53, plasticized material 57 is drawn from the trough 55 relative to the bath 53 and the liquid portion 71 of the contained fluid charge into a tube 72 in much the same manner as described above, with plasticized material being continuously delivered into the trough 55 through conduit 59. Nip rolls 73 are provided for applying a uniform drawing force and containing the gaseous portion 75 of fluid charge as heretofore described. The bath 53 or other suitable mediums may be used for stabilizing the tube of plasticized material as it travels through or leaves the liquid bath 53. It will be understood that the apparatus of FIGURES 9 and 10 may be used for making flexible or rigid tubes and that liquids of different densities may be employed in the liquid bath 53 and the liquid portion 71 of the contained fluid charge.

The particular liquids used as the baths 17 and 53 and the liquid portions 25 and 71 of the fluid charges will depend upon various factors such as the chemical character and density of the plasticized material, the size of the tube desired, the rate at which coagulation may be effected if the liquids are to serve as coagulating mediums, and so forth. It will of course be apparent that the liquids employed should be less dense and should not mix or chemically unite with the plasticized material. The term "liquid," as heretofore defined, includes a variety of materials from solutions to materials which are in a molten condition at the temperature of operation, and thus low melting point metals, such as gallium, may be used if desired.

As heretofore mentioned, the plasticized material appears to flow as an annular layer along the surface of the contained mass as it is drawn from the trough 19 or 55 and shaped into a tube form. The liquid of the bath 17 or 53, when employed as a coagulating medium, will tend to effect a preliminary setting or stabilization of the surface layer of plasticized material in the trough 19 or 55, with complete coagulation occurring as the tube of plasticized material travels through the liquid bath. Alternatively, premature coagulation of the surface layer of plasticized material in the trough 19 or 55 may be avoided by covering the same with a shallow layer of protective liquid. This protective liquid should neither mix nor chemically react with the adjacent materials and should have a density in between that of the liquid bath and the plasticized material being used. For example, when water is employed in coagulating a tube formed of viscose, a layer of methyl benzoate may be placed over the viscose contained in the troughs 19 and 55. In lieu of or in combination with a protective liquid, it will of course be apparent that this last described procedure may be utilized in applying coatings or a desirable finish or color to the exterior of the tube concomitantly with its formation.

It is understood that to form flat film the tube is slit longitudinally in one or more places after the tube has been withdrawn from the liquid bath.

While preferred embodiments of the invention have been shown and described, it is to be understood that changes and variations may be made without departing from the spirit and scope of the invention as defined in the appended claims.

I claim:

1. A method of making tubes, film, and like articles including the steps of disposing a mass of plasticized material within a liquid bath, said plasticized material having a density at least equal to that of said liquid bath, injecting a fluid charge including a liquid portion within the mass of plasticized material to thereby contain the same therein, said liquid bath and fluid charge being immiscible with the plasticized material, drawing the plasticized material through the liquid bath and relative to the contained fluid charge to thereby shape the plasticized material into a tube, and setting the tube of plasticized material.

2. A method as defined in claim 1 wherein the mass of plasticized material is separated from said bath by a solution having a density between that of said bath and said plasticized material.

3. A method as defined in claim 2 wherein said solution is a liquid finish for coating the outside surface of said tube concomitantly with the shaping thereof.

4. A method as defined in claim 3 wherein said liquid finish is a dye.

5. A method as defined in claim 1 wherein the fluid charge is of a density at least equal to that of said liquid bath.

6. A method as defined in claim 1 wherein said fluid charge is of a density not greater than that of said liquid bath.

7. A method as defined in claim 1 further including the step of continuously supplying plasticized material during the drawing thereof to maintain a generally uniform mass of the same adjacent to the contained fluid charge.

8. A method as defined in claim 1 wherein the plasticized material is set concomitantly with the shaping thereof into a tube.

9. A method as defined in claim 1 wherein the plasticized material is of thermoplastic character and of a density greater than said liquid bath, and wherein the tube of plasticized material is set after leaving the liquid bath.

10. A method as defined in claim 1 wherein the plasticized material is of thermosetting character and of a density greater than said liquid bath, and wherein the tube of plasticized material is set after leaving the liquid bath.

11. A method as defined in claim 1 wherein the fluid charge is composed entirely of liquid.

12. A method of making tubes, films, and like articles including the steps of containing a fluid charge including a liquid by injecting the same within a mass of plasticized film forming material positioned within a liquid bath to expand a portion of the mass, said film-forming material having a density at least equal to that of said bath and being immiscible with the liquid bath and fluid charge, withdrawing the expanded portion of the mass to draw film forming material through the liquid bath and relative to the contained fluid charge to thereby shape the same into a tube, and setting the tube of film-forming material.

13. A method as defined in claim 12 wherein the tube is slit longitudinally to form a flat film.

14. A method as defined in claim 13 wherein the liquid of the fluid charge is of less density than the liquid of the bath.

15. A method as defined in claim 13 wherein the liquid of the fluid charge is of greater density than the liquid of the bath.

16. A method as defined in claim 13 wherein the liquids of the fluid charge and bath are of substantially the same density.

17. A method as defined in claim 12 wherein the fluid charge consists of a mixture of liquid and gas.

18. A method of making continuous tubes including the steps of containing a fluid charge including a liquid by injecting the same into a mass of plasticized material positioned within a liquid bath to expand a portion of the mass, said plasticized material having a density at least equal to that of said bath and being immiscible with the liquid bath and fluid charge, withdrawing the expanded portion of the mass from the liquid bath to draw a continuous sheet of plasticized material relative to the fluid charge and thereby shape the same into a tube, continuously delivering plasticized material at a location below the fluid charge, and setting the tube of plasticized material.

19. A method of making tubes and like articles including the steps of containing a fluid charge by injecting the same into a mass of plasticized material positioned within a liquid bath to expand a portion of the mass into a bulbulous envelope, said plasticized material having a density at least equal to that of said bath and being immiscible with the liquid bath and fluid charge, said fluid charge including a gaseous portion for buoyantly carrying the envelope of plasticized material toward the surface of the liquid bath and a liquid portion which serves as a fluid mandrel, withdrawing the expanded portion of plasticized material from the liquid bath to draw plasticized material from the mass and relative to the liquid portion of the fluid charge to thereby shape the same into a tube, the liquid portion of the fluid charge and the surrounding liquid bath cooperating to control the thickness of the tube wall during the drawing thereof, and stabilizing the tube of plasticized material concomitantly with the forming thereof.

20. A method as defined in claim 19 further including the step of flattening the stabilized tube to contain the gaseous portion of the fluid charge.

References Cited in the file of this patent

UNITED STATES PATENTS

| | | |
|---|---|---|
| Re. 19,329 | Weingand | Sept. 24, 1934 |
| 700,806 | Paine | May 27, 1902 |
| 1,518,734 | Frink | Dec. 9, 1924 |
| 2,452,080 | Stephenson | Oct. 26, 1948 |
| 2,541,064 | Irons | Feb. 13, 1951 |
| 2,549,327 | Moule | Apr. 17, 1951 |
| 2,586,971 | McDermott | Feb. 26, 1952 |
| 2,708,617 | Magat et al. | May 17, 1955 |